(No Model.) 2 Sheets—Sheet 1.

P. B. TICE.
CULTIVATING PLOW.

No. 465,297. Patented Dec. 15, 1891.

Witnesses:
W. C. Boone
C. L. Arch

Philip B. Tice Inventor.

THE NORRIS PETERS CO., PHOTO-LITHO., WASHINGTON, D. C.

(No Model.)
2 Sheets—Sheet 2.
P. B. TICE.
CULTIVATING PLOW.
No. 465,297.  Patented Dec. 15, 1891.
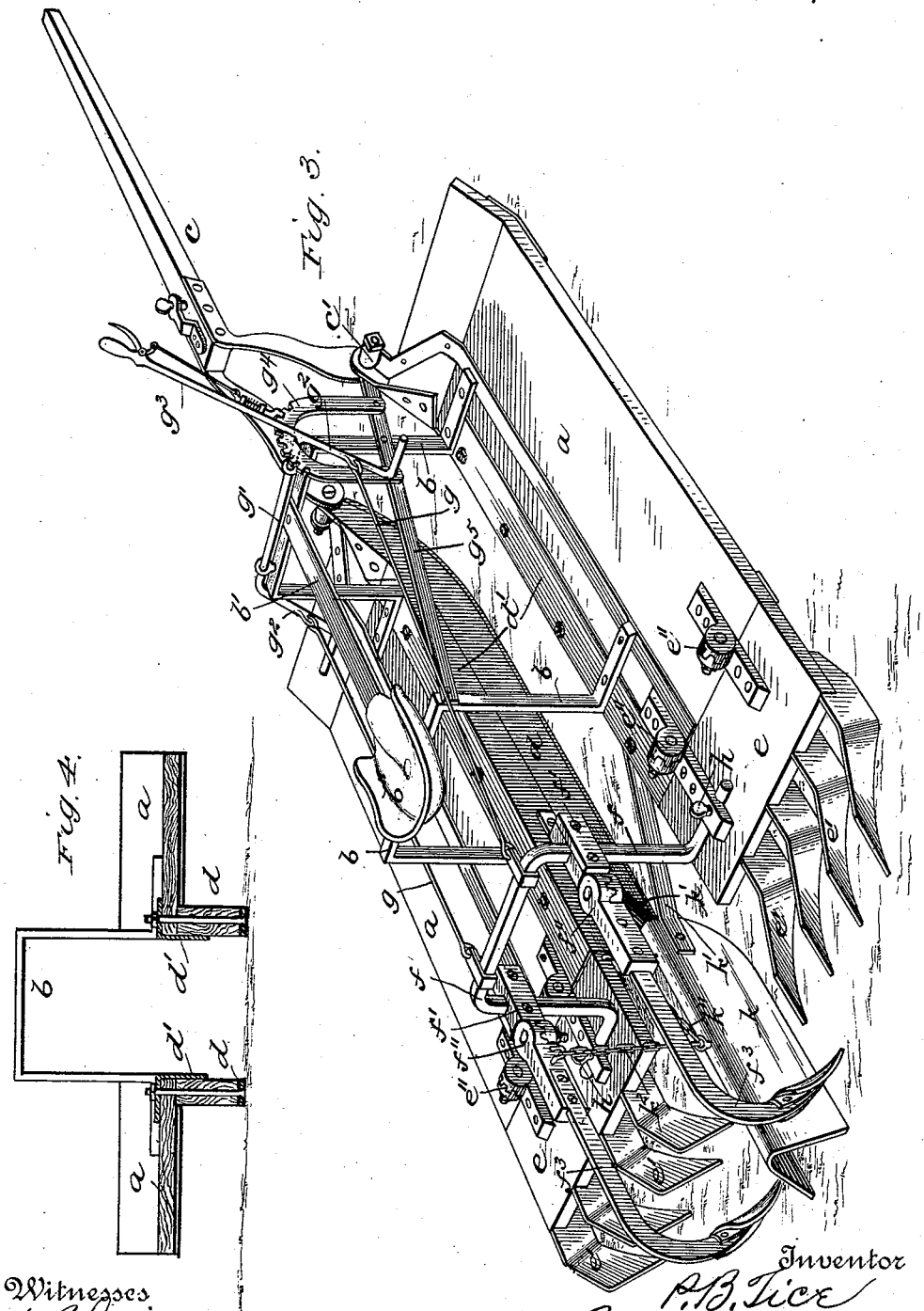
Witnesses
W. R. Davis
E. J. Cussen
Inventor
P. B. Tice
By Alexander & Davis
his Attorneys

UNITED STATES PATENT OFFICE.

PHILIPP BYTHSEA TICE, OF LONGTON, KANSAS.

CULTIVATING-PLOW.

SPECIFICATION forming part of Letters Patent No. 465,297, dated December 15, 1891.

Application filed October 28, 1890. Serial No. 369,623. (No model.)

*To all whom it may concern:*

Be it known that I, PHILIPP BYTHSEA TICE, a citizen of the United States, residing in the town of Longton, in the county of Elk and State of Kansas, have invented a new and useful Corn-Cultivator, of which the following is a specification.

Figure 1:
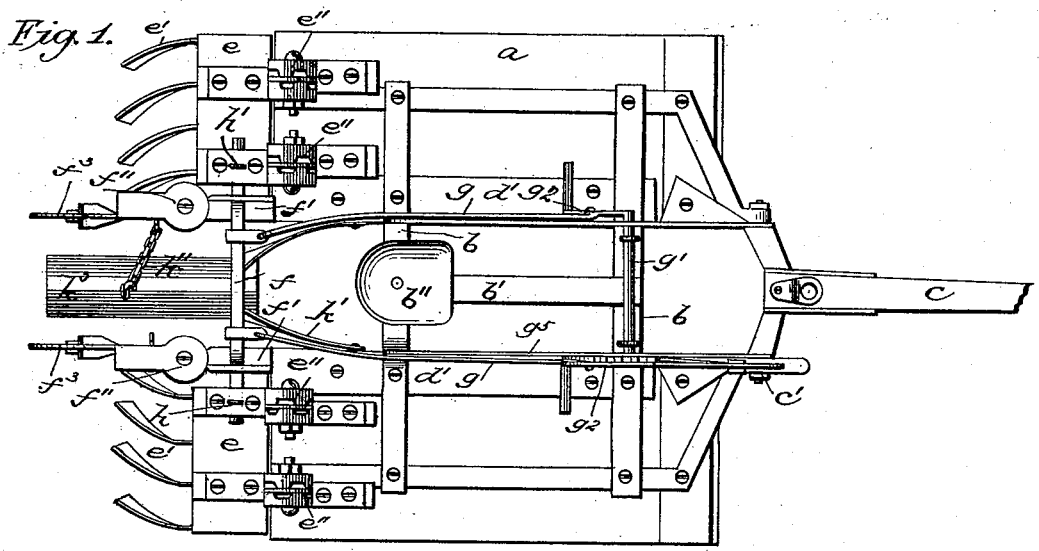
Figure 2:
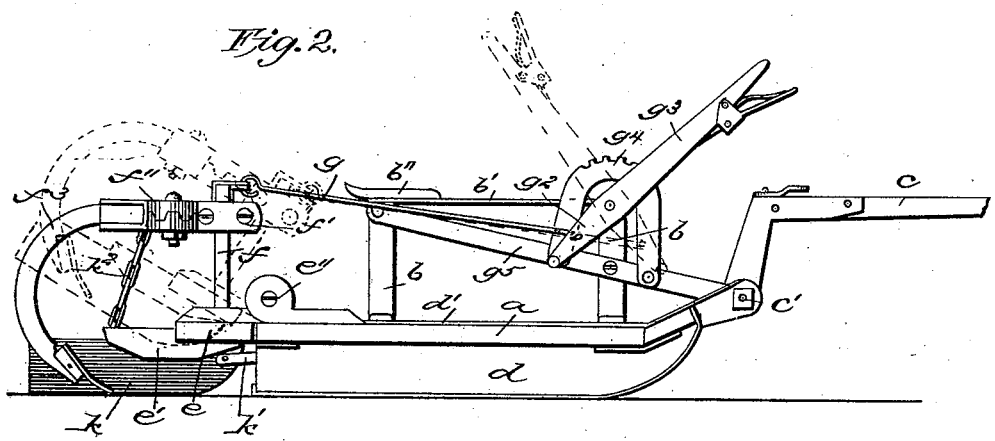

Referring to the accompanying drawings, Figure 1 represents a plan view of my improved machine; Fig. 2, a side elevation of the same; Fig. 3, a perspective view, and Fig. 4 a detail cross-section.

This invention relates to combined corn-cultivators and clod crushers or pulverizers; and it has for its object the production of an eminently efficient and simple machine of that character, as will fully hereinafter appear.

The invention consists of certain novel features of construction and arrangement of parts, that will be fully hereinafter described, and particularly pointed out in the claims.

In the drawings, $a\,a$ designate two horizontal boards or sections which are separated a sufficient distance and rigidly connected together by rigid arches $b\,b$, whereby they may straddle the row of corn being cultivated. The forward ends of the sections are flared upwardly to better ride over and pulverize clods in the path of the machine. A draft-pole $c$ is suitably connected to draft-irons $c'$, attached to the forward ends of the sections. Along the inner edges of the sections are removably secured by vertical bolts runners $d\,d$, which extend the full length of the sections and serve to transport them and their attached devices. The vertical bolts that removably secure the runners to the sections also secure angle-irons $d'\,d'$ to the respective inner edges thereof, the vertical depending edges of these irons serving as guards when the runners are removed. A bar $b'$ rigidly connects the arches, and the driver's seat $b''$ is secured to this bar. The working faces of the sections and runners may be lined or bound with sheet metal to take up the wear.

Hinged removably to the rear end of each of the sections $a$ is a vertically-swinging short section $e$, which is provided with rearwardly-extending pulverizing-blades $e'$, which are turned or bent inwardly at their rear ends to throw the soil toward the row being cultivated. These pulverizing-sections $e$ may be changed from one side to the other in order that the soil may be thrown away from the row, if desired. The adjacent faces of the leaves of the hinges $e''$, connecting these sections to the main sections, are provided with interlocking notches or lugs which engage with each other and lock the swinging sections rigidly to the main sections, so as to hold them above the ground and prevent them swinging up or down, as shown in Figs. 2 and 3, when necessary. When it is desired to have the short sections swing loosely on their pintles and accommodate themselves to the ground, smooth loose washers are inserted between the locking-notches, as shown in Fig. 1, whereby the notches will be prevented from interlocking. A rocking arch $f$ connects the two rear sections, the ends of this arch being extended outwardly and journaled on the upper sides of the respective sections. Two vertically-adjustable clamps $f'$ are secured on the vertical portions of this arch, and adjustably connected to each of these clamps by means of a hinge-joint $f''$ is a rearwardly-extending shovel-plow $f^3$. The hinge-joints $f''$ each consists of a pair of horizontal plates or disks, connected, respectively, to the adjustable clamps and to the plow-beams and connected together by vertical bolts, the adjacent faces of the disks being provided with interlocking notches similar to the hinges connecting the rear sections $e$ to the main sections. These lock-hinges enable the plows to be adjusted laterally independently of each other and with respect to the row being cultivated and then locked in their adjusted positions, and the vertical adjustable clamps $f'$ enable them to be adjusted vertically to suit the character of work being performed.

The connected plows are raised off the ground and lowered, when desired, by the driver by means of the following or any other suitable devices. Connected to the rocking arch and extending forwardly, one on each side of the rigid arches, are two rods $g\,g$, pivotally connected at their forward ends to the depending arms $g^2$ of a rock-shaft $g'$, journaled on top of the front arch. The lower ends of arms $g^2$ are extended outwardly in opposite directions to form foot-rests for the driver. Connected to the rock-shaft $g'$ at one end is a hand-lever $g^3$, which is provided with the usual spring-actuated bolt or dog adapted to engage a suitable notched segment $g^4$, rigidly secured to a bar $g^5$, connecting and bracing the rigid arches, the forward end of this bar $g^5$ being extended forward and connected to one of the draft-irons. It will be observed that by adjusting the hand-lever back and forth the rocking arch may be rocked back and forth and the connected plows raised or lowered, as desired. The driver may also raise the plows by simply pushing forward on the foot-pieces on the arms $g^2$, as is evident.

Should it be desired to lock the arch rigidly to the swinging sections so that the latter may be raised and lowered with the arch and plows, it may be done by means of set-screws $h$, which are tapped in the bearing of the journals of the arch and adapted to bear upon the journals and prevent them rocking. The bearings for the journals of the arch are in the present instance formed by the leaves of the hinges connecting the swinging sections to the main sections; but it is evident that they may, if desired, be made in other ways.

A longitudinally-bent sheet-metal shield $k$ is connected pivotally to the inner edges of the main sections, near their rear ends by means of bent rods $k'$, this shield being arranged to straddle the row of young corn and protect it from injury by the soil thrown up by the plows and pulverizing-blades. It is adapted to swing vertically to accommodate itself to the undulatory surface of the soil, and is connected by a chain or chains $k''$ to the plows, so that it may be raised from the ground with them.

This machine, besides its general efficiency and inexpensive construction and durability, has a number of other obvious advantages. In cultivating check-row-planted corn, the wooden runners are removed, when the depending longitudinal edges of the metal angle-irons $g'$ will serve as guards to protect the growing corn. This machine is particularly adapted for cultivating listed corn; and while two plows only are shown it is evident that others may be attached, if desired. For instance, two more may be attached to the lock-hinges, one on each side. By means of the pivoted shield the corn may be cultivated when very young without injury and without necessitating the employment of extra help to follow the machine, to uncover the corn from the soil thrown up by the plows. When the runners are removed and the sections let down on the ground they serve, together with the bent pulverizing-blade, as efficient clod crushers and pulverizers.

Having thus fully described my invention, what I claim, and desire to secure by Letters Patent, is—

1. In a corn-cultivator, the combination of the two main sections, the angle-irons secured along their inner edges and having depending guard-flanges $d'$, the runners removably attached to the inner edges of the main sections in the angle formed by the angle-irons, arches connecting the sections, and cultivating-plows connected to the sections, substantially as described.

2. In a corn-cultivator, the combination of two separated main sections connected by arches, sections $e$, hinged to the rear ends of the main sections by lock-hinges $e''$, and provided with rearwardly-extending blades $e'$, an arch connecting these sections, plows adjustably connected to this arch, and means for raising the arch and hinged sections, substantially as described.

3. In a corn-cultivator, the combination of a pair of separated main sections, smaller sections $e\ e$, hinged to the rear ends of the main sections and provided with pulverizing-blades, an arch $f$, connecting the two sections, and means for raising this arch, clamps $f'$, secured adjustably on the vertical bars of said arch, and rearwardly-extending plows $f^3$, adjustably connected to said clamps, substantially as described.

4. The combination of the two main sections provided with runners, the swinging sections hinged thereto and provided with pulverizing-blades, a pivoted arch connecting said swinging sections, rearwardly-extending plows adjustably connected to said arch, a vertically-movable shield between said plows and connected to them, and means for rocking the arch, substantially as described.

PHILIPP BYTHSEA TICE.

Witnesses:
 ORAN A. HIATT,
 WILLIAM H. RIGGIN.